US012604260B2

(12) United States Patent
Kuravangi-Thammaiah et al.

(10) Patent No.: US 12,604,260 B2
(45) Date of Patent: Apr. 14, 2026

(54) SYSTEMS AND METHODS FOR DYNAMIC SLICE SELECTION IN A WIRELESS NETWORK

(71) Applicant: Verizon Patent and Licensing Inc., Basking Ridge, NJ (US)

(72) Inventors: Shanthala Kuravangi-Thammaiah, Keller, TX (US); Sudhakar Reddy Patil, Flower Mound, TX (US); Jerry Steben, Forth Worth, TX (US); Suzann Hua, Beverly Hills, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 408 days.

(21) Appl. No.: 18/332,859

(22) Filed: Jun. 12, 2023

(65) Prior Publication Data

US 2024/0414637 A1 Dec. 12, 2024

(51) Int. Cl.
H04W 48/18 (2009.01)
H04W 48/14 (2009.01)
(Continued)

(52) U.S. Cl.
CPC ........... H04W 48/18 (2013.01); H04W 48/14 (2013.01); H04W 72/0453 (2013.01); H04W 72/56 (2023.01)

(58) Field of Classification Search
CPC . H04W 48/18; H04W 48/14; H04W 72/0453; H04W 72/56; H04W 76/11; H04W 76/12; H04W 24/02; H04W 88/14
(Continued)

(56) References Cited

U.S. PATENT DOCUMENTS

| | | | | |
|---|---|---|---|---|
| 2022/0386401 A1* | 12/2022 | Qiao | ................. | H04W 28/0215 |
| 2023/0199859 A1* | 6/2023 | Li | .................... | H04W 74/0833 |
| | | | | 370/329 |
| 2024/0381081 A1* | 11/2024 | Normann | .............. | H04W 12/06 |

OTHER PUBLICATIONS

Third Generation Partnership Project, "Technical Specification Group Core Network and Terminals; 5G System; Unified Data Management Services; Stage 3 (Release 18)," 3GPP TS 29.503 V18.1.0 (Mar. 2023).

(Continued)

*Primary Examiner* — Kwang B Yao
*Assistant Examiner* — Syed M Bokhari

(57) ABSTRACT

A system described herein may receive a communication session request associated with a particular User Equipment ("UE") and a network that includes a plurality of network slices. The communication session request may include a particular identifier, such as a Data Network Name ("DNN") or other type of identifier. The system may output a request for network slice information, wherein the request includes the particular identifier; and may receive network slice information that indicates multiple network slices that were selected based on the particular identifier. A Unified Data Management function ("UDM"), Unified Data Repository ("UDR"), and/or other element of the network may provide such information. The system may identify network slice priority information that indicates relative priorities of the network slices, may select a particular network slice based on the network slice priority information, and may respond to the communication session request in accordance with the selected first network slice.

20 Claims, 12 Drawing Sheets

Communication session request, including the particular DNN

Maintain information associating DNNs with slices, including multiple slices for a particular DNN, and rules/conditions for slice selection for the particular DNN

UE 103

Network 101

Communication session establishment via selected particular slice

Select particular slice, out of multiple slices associated with particular DNN based on rules/conditions

(51) Int. Cl.
  *H04W 72/0453* (2023.01)
  *H04W 72/56* (2023.01)
(58) Field of Classification Search
  USPC ......................................................... 370/329
  See application file for complete search history.

(56) References Cited

OTHER PUBLICATIONS

Third Generation Partnership Project, "Technical Specification Group Core Network and Terminals; 5G System; Unified Data Repository Services; Stage 3 (Release 18)," 3GPP TS 29.504 V18.1.0 (Mar. 2023).

Third Generation Partnership Project, "Technical Specification Group Core Network and Terminals; 5G System; Usage of the Unified Data Repository services for Subscription Data; Stage 3 (Release 18)," 3GPP TS 29.505 V18.1.0 (Mar. 2023).

* cited by examiner

Figure 1:
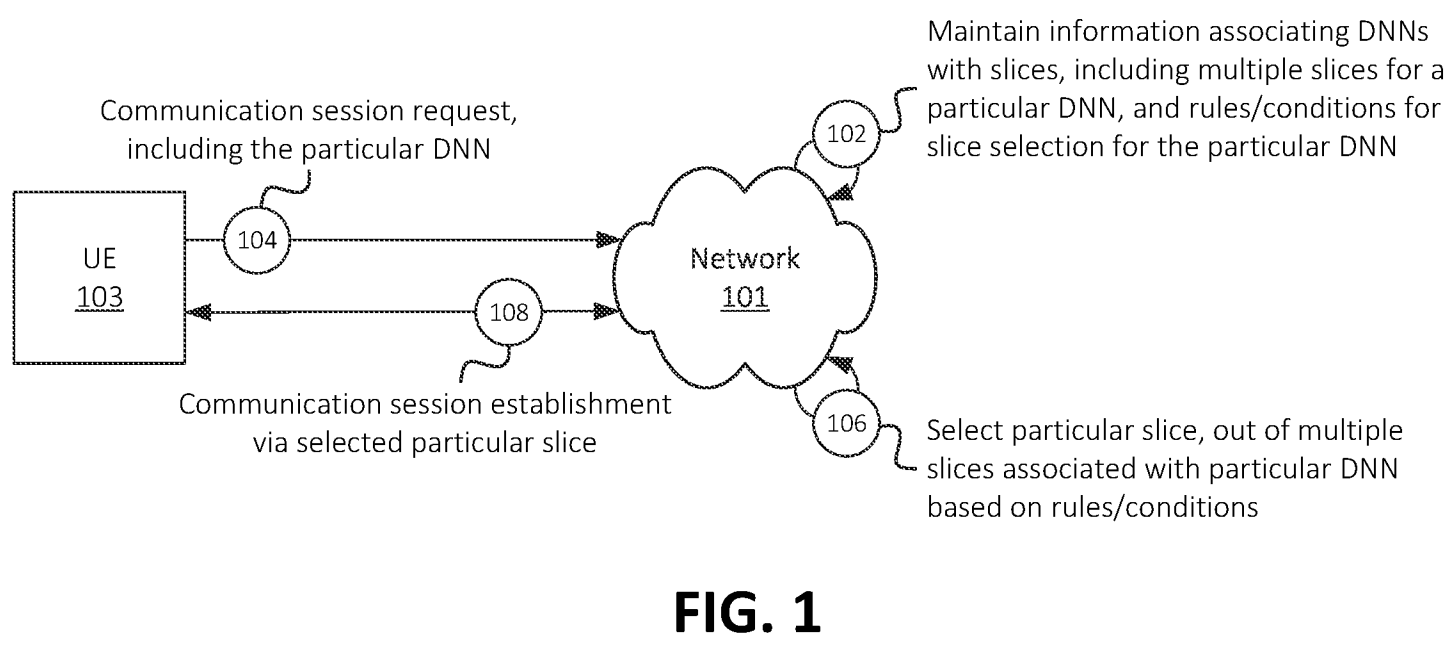

Maintain information associating DNNs with slices, including multiple slices for a particular DNN, and rules/conditions for slice selection for the particular DNN Select particular slice, out of multiple slices associated with particular DNN based on rules/conditions

102

106

Network
101

Communication session request, including the particular DNN

104

108

Communication session establishment via selected particular slice

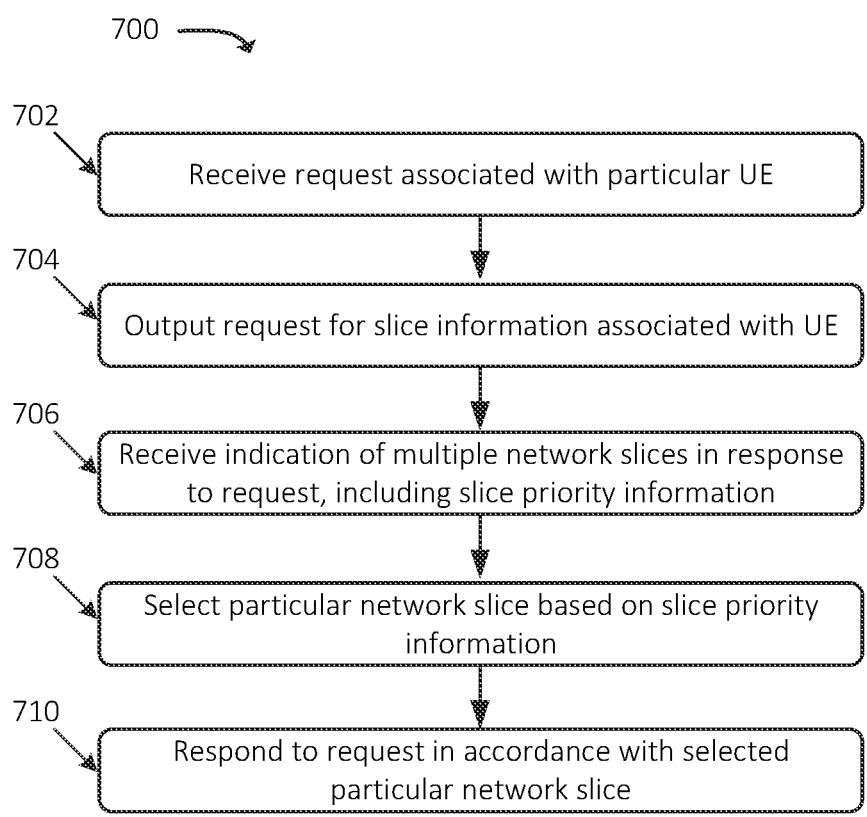

700

702

Receive request associated with particular UE

704

Output request for slice information associated with UE

706

Receive indication of multiple network slices in response to request, including slice priority information

708

Select particular network slice based on slice priority information

710

Respond to request in accordance with selected particular network slice

Output component

1150

Input component

1140

Memory

1130

Bus
1110

Communication
interface

1160

Processor

1120

SYSTEMS AND METHODS FOR DYNAMIC SLICE SELECTION IN A WIRELESS NETWORK

BACKGROUND

Wireless networks provide wireless connectivity to User Equipment ("UEs"), such as mobile telephones, tablets, Internet of Things ("IoT") devices, Machine-to-Machine ("M2M") devices, or the like. Wireless networks may provide different measures of quality of service ("QoS"), such as varying performance thresholds (e.g., maximum latency thresholds, minimum throughput thresholds, etc.), by providing different network slices that are each associated with a particular set of QoS parameters. A network slice may include, or may be implemented by, a logically distinct set of network elements of a core and/or a radio access network ("RAN") or a wireless network. UEs may request access to particular network slices by providing Data Network Names ("DNNs") or other suitable identifiers when requesting the establishment of communication sessions with the wireless network.

BRIEF DESCRIPTION OF THE DRAWINGS

FIG. 1 illustrates an example overview of one or more embodiments described herein;

FIG. 7 illustrates an example process for identifying a network slice for a UE based on network slice priority information, in accordance with some embodiments;

DETAILED DESCRIPTION OF EXAMPLE EMBODIMENTS

Figure 2:
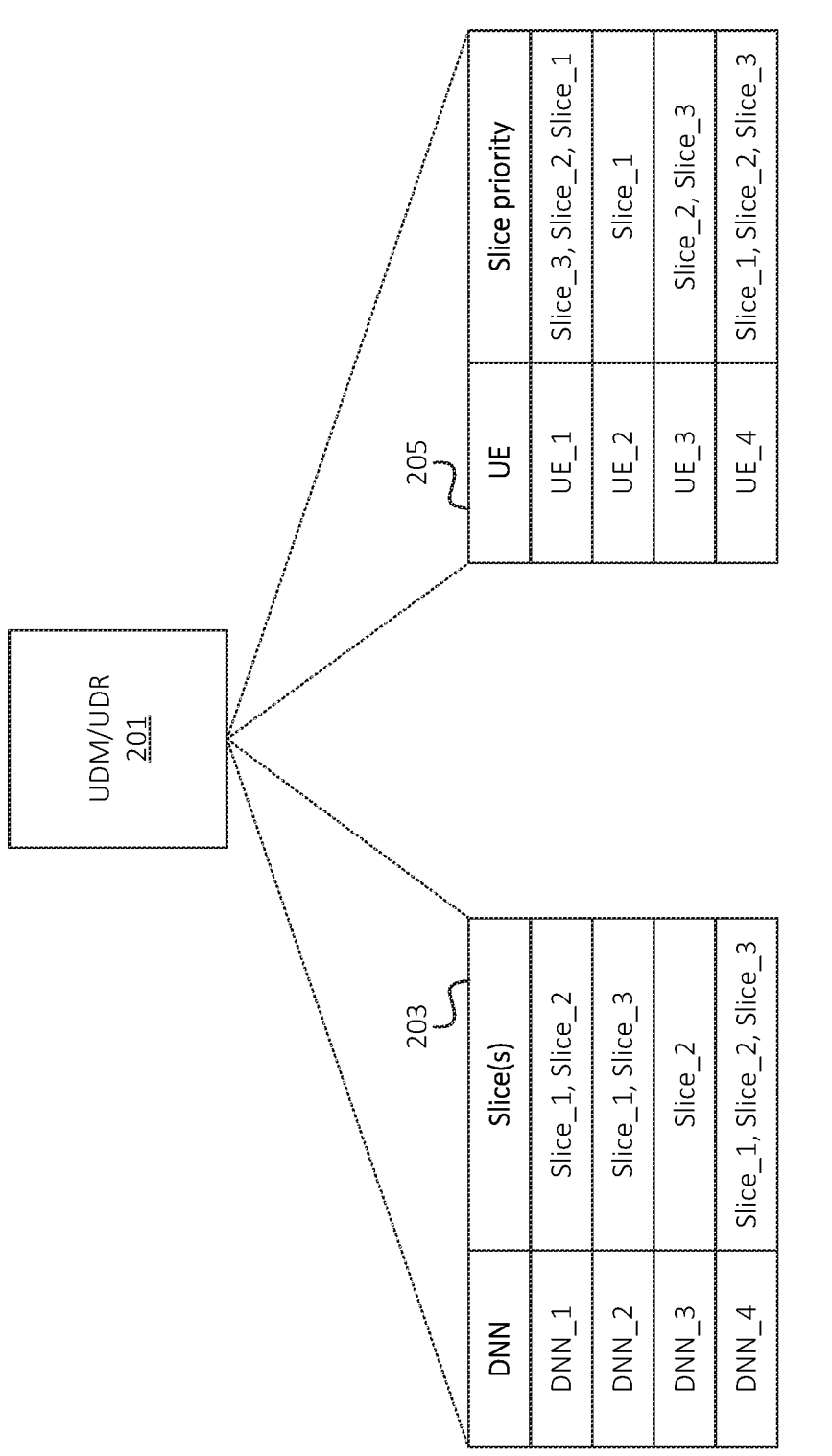
FIGS. 2 and 3 illustrate example slice information in accordance with some embodiments.

The following detailed description refers to the accompanying drawings. The same reference numbers in different drawings may identify the same or similar elements.

A wireless network may include a set of network elements, such as network functions ("NFs"), that perform various operations associated with the wireless network. Such operations may relate to managing access to the wireless network, enforcing QoS policies for UEs accessing the wireless network, routing traffic to and from the wireless network, and/or other operations. The wireless network may include multiple network slices, which may include different instances of various network functions. Different network slices may be associated with different QoS parameters (e.g., different performance thresholds), access policies, or may have other differentiating factors. A UE may request access to the wireless network via a particular network slice by requesting or otherwise indicating an identifier associated with the particular network slice. Some networks make use of Data Network Names ("DNNs"), Access Point Names ("APNs"), or other suitable identifiers that UEs may use when requesting a given network slice.

In some situations, a network operator may associate multiple slices with a particular DNN, APN, etc. (referred to herein simply as "DNN" for the sake of brevity). For example, the wireless network may include multiple network slices that are able to deliver services according to a set of QoS parameters associated with a given DNN. As another example, the wireless network may include multiple network slices that are associated with the same set of QoS parameters. Embodiments described herein provide a mechanism for selecting between different network slices that are associated with a particular DNN. Such embodiments may allow for a network to have more granularity with regard to network slices, without needing to alter a schema by which DNNs are defined or implemented. Further, the wireless network may be able to perform dynamic load balancing between slices, without involving UEs in the load balancing procedures (e.g., the selection between different network slices for a given DNN may be transparent to a UE, thus simplifying the operation of the UE).

As shown in FIG. 1, network 101 may maintain (at 102) information associating one or more DNNs with network slices, including information mapping multiple network slices to at least a particular DNN. For example, an "Internet" DNN may be associated with multiple network slices, such as a "best effort" network slice (e.g., a first network slice that provides services on a "best effort" basis, such as with relatively high latency thresholds and relatively low throughput thresholds), a "low latency" network slice (e.g., a second network slice that provides services with a relatively low latency threshold), and/or one or more other network slices.

Network 101 may also maintain rules, conditions, or other information based on which a particular network slice may be selected for a given UE (e.g., UE 103) when such UE requests access to network 101. For example, as discussed below, such rules or conditions may relate to a traffic or service type associated with requested communications between UE 103 and network 101 (e.g., voice call, video streaming, email, etc.), a category or classification of UE 103 (e.g., first responder, enterprise user, etc.), load or congestion of various network slices, subscription or service information associated with UE 103 (e.g., whether UE 103 has subscribed to a particular service plan or otherwise has access to a particular network slice), and/or other types of rules or conditions. In some scenarios, the rules and/or conditions may be modified in a dynamic and ongoing fashion, such as by iterative refinement via artificial intelligence/machine learning ("AI/ML") techniques. For example, the mapping of particular rules, conditions, etc. with particular network slices may be dynamically modified or refined in order to improve the overall performance, reliability, or other metrics of network 101.

As further shown, UE 103 may, at some point, request (at 104) a communication session request between UE 103 and network 101. The communication session request may include, or may be associated with, an initial registration request (e.g., an initial wireless connection between UE 103 and a RAN of network 101), a user plane communication session (e.g., an Internet Protocol ("IP")-based communication session, such as a Protocol Data Unit ("PDU") session), or some other suitable type of communication session. While embodiments are described herein in the context of UE requesting (e.g., at 104) a communication session between UE 103 and network 101, similar concepts may apply when another device or system requests a communication session associated with UE 103 (e.g., attempts to communicate with UE 103), such as a service provider server, another UE, or the like.

In some embodiments, the communication session request may include a DNN or other suitable value or indicator. Generally, such value or indicator may be associated with a set of QoS parameters, and/or may indicate a class or category of services (e.g., "Internet," "data," "voice," etc.). As noted above, the DNN may be associated with multiple potential network slices that may be selected (at 106) by network 101 based on particular rules, conditions, etc. As discussed below, network 101 may select a particular network slice, out of the multiple candidate network slices associated with the requested DNN (e.g., based on the information maintained (at 102) by network 101), and may establish (at 108) the requested communication session with UE 103 via the selected network slice.

For example, in one scenario, network 101 may select (at 106) a first network slice based on the requested DNN under a first set of conditions (e.g., the first network slice is not congested and/or load metrics associated with the first network slice are below a threshold measure of load), while network 101 may select a second network slice for the same requested DNN under a second set of conditions (e.g., the first network slice is congested and/or load metrics associated with the first network slice are above a threshold measure of load). As another example, network 101 may select (at 106) the first network slice for a given DNN when UE information as maintained by network 101 (e.g., subscription information, service plan information, authorization information, etc.) indicates that UE 103 is authorized to access the first network slice, while network 101 may select the second network slice for the same DNN when the UE information maintained by network 101 does not indicate that UE 103 is authorized to access the first network slice.

FIG. 2 illustrates an example of DNN information and/or UE information that may be maintained by network 101. For example, such information may be maintained by one or more information repositories of network 101, such as a Unified Data Management ("UDM") function, a Unified Data Repository ("UDR"), and/or some other suitable device or system. In the examples discussed herein, the one or more information repositories are represented by UDM/UDR 201. In some embodiments, some or all operations described herein with regard to UDM/UDR 201 may be performed by a UDM. In some embodiments, some or all operations described herein with regard to UDM/UDR 201 may be performed by a UDR. In some embodiments, some or all operations described herein with regard to UDM/UDR 201 may be performed by a Home Subscriber Server ("HSS") and/or some other device or system.

Data structure 203 represents example DNN information that may be maintained by UDM/UDR 201. The DNN information may indicate particular network slices, of network 101, that are associated with particular DNNs. For example, DNN_1 may be associated with Slice_1 and Slice_2, DNN_2 may be associated with Slice_1 and Slice_3, DNN_3 may be associated with Slice_2, and DNN_4 may be associated with Slice_1, Slice_2, and Slice_3. The associations between various DNNs and slices may be manually provided or adjusted by an owner or operator of network 101, may be automatically or dynamically determined or adjusted (e.g., via AI/ML techniques or other suitable automated techniques), and/or may be provided or adjusted in some other suitable manner. As one example, multiple different slices may be capable of delivering QoS parameters in accordance with thresholds, service level agreements ("SLAs"), etc. specified in accordance with particular DNNs. As another example, various slices may have extra capacity available, and the information in data structure 203 may be dynamically adjusted to authorize additional DNNs for such slices.

Data structure 205 indicates particular network slices for which particular UEs are authorized. Data structure 205 may include a UE identifier for each UE (represented as "UE_1," "UE_2," etc.), such as a Subscription Permanent Identifier ("SUPI"), a Globally Unique Temporary Identifier ("GUTI"), an International Mobile Station Equipment Identity ("IMEI"), an International Mobile Subscriber Identity ("IMSI"), a Mobile Directory Number ("MDN"), and/or other suitable identifier. For example, UE_1 may be authorized to access network 101 via Slice_1, Slice_2, and Slice_3, UE_2 may be authorized to access network 101 via Slice_1, and so on.

As further shown, each UE may be associated with different priority levels for each slice. For example, Slice_3 may have a highest priority for UE_1, while Slice_2 and Slice_1 may have lower priority for UE_1. On the other hand, Slice_1 may have a highest priority for UE_4, while Slice_2 and Slice_3 have relatively lower priority for UE_4. The various priority levels, for each UE, may be based on subscription information, types or categories of such UEs, and/or other factors. In some embodiments, the authorization for particular network slices, and/or the priority of such network slices for each UE, may be determined or provided by an owner or operator of network 101, may be automatically adjusted through AI/ML techniques, or may be determined in some other manner.

Figure 3:
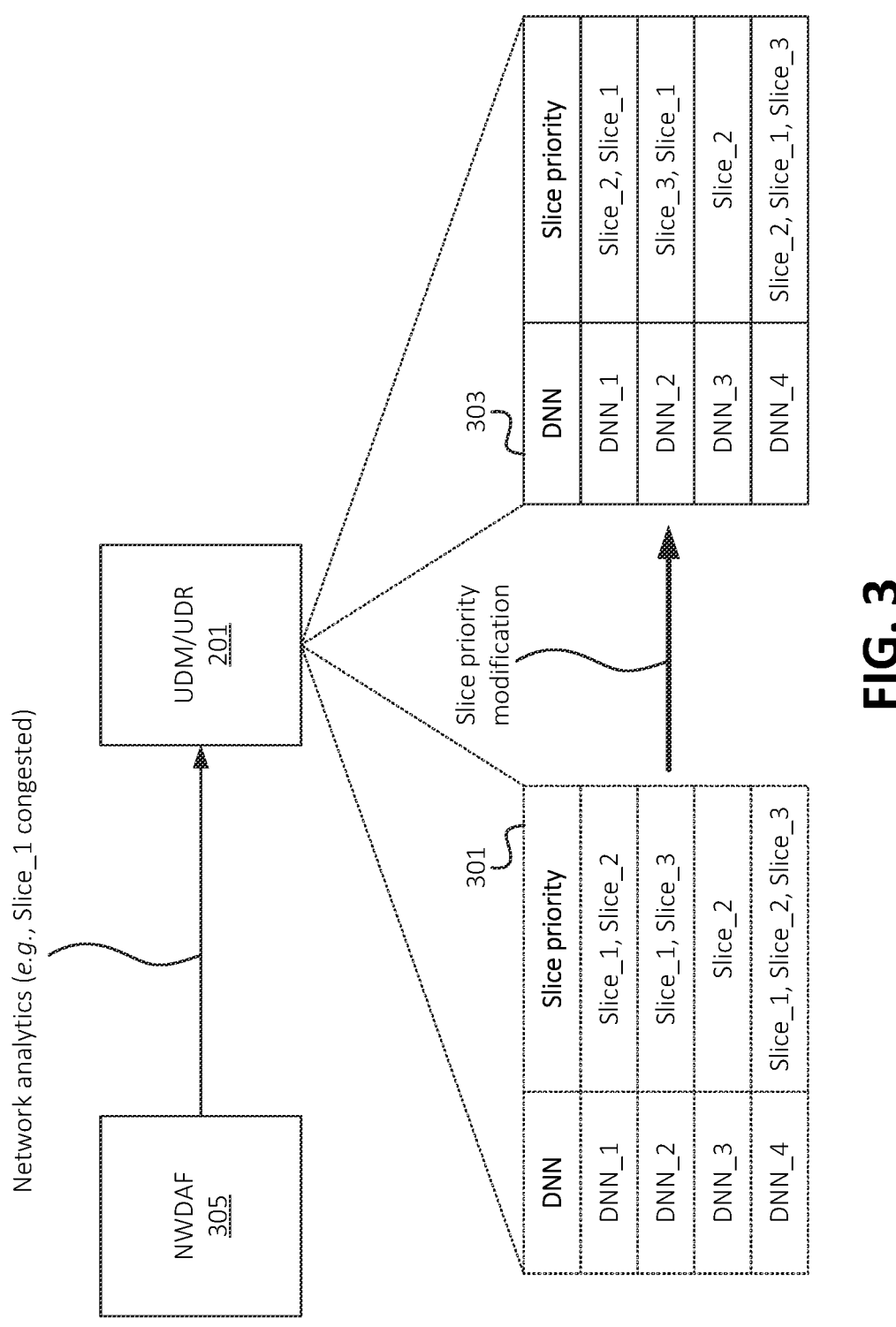

FIG. 3 illustrates another example of DNN information that may be maintained by UDM/UDR 201, in accordance with some embodiments. As shown, UDM/UDR 201 may maintain data structure 301, which indicates slices associated with particular DNNs, as well as a relative priority for each slice with regard to each DNN. Data structure 301 may reflect "universal" or "system-wide" slice priority information for each DNN. As shown, in this example, Slice_1 may be a highest priority slice for DNN_1 and Slice_2 may be a lower priority slice for DNN_1, Slice_1 may be a highest priority slice for DNN_2 and Slice_3 may be a lower priority slice for DNN_2, and so on.

In some situations, the slice priorities for particular DNNs may change. For example, as shown, UDM/UDR 201 may receive network analytics information from Network Data and Analytics Function ("NWDAF") 305 and/or some other suitable source. In this example, the analytics information may indicate that Slice_1 is relatively congested, overloaded, etc. (e.g., relative to other slices, and/or relative to particular thresholds). For example, the analytics information may indicate that throughput metrics associated with the particular slice exceed a threshold throughput, that a quantity of connections via the particular slice exceed a threshold quantity of connections, etc. Additionally, or alternatively, the network analytics information may reflect the operational status of one or more devices that implement one or more network functions that serve a given slice, such as "operational," "failed," "powered off," etc. In some embodiments, additional or different types of network analytics information may be provided by NWDAF 305 and/or some other suitable device or system.

In some embodiments, UDM/UDR 201 may modify slice priority information based on network analytics information received from NWDAF 305 and/or some other suitable source. In some embodiments, some other device or system may modify slice priority information (e.g., based on network analytics information and/or other information) and may provide the modified slice priority information to UDM/UDR 201.

The modified slice priority information may be reflected by data structure 303, which may be maintained or otherwise used by UDM/UDR 201 (e.g., in lieu of data structure 301) after modification of the slice priority information. In this example, since Slice_1 is relatively congested (as indicated by information provided by NWDAF 305), the priority of Slice_1 may be reduced relative to other slices. For example, as shown in data structure 303, DNN_1 may be associated with Slice_2 as a highest priority slice and Slice_1 as a lower priority slice after the modification, and DNN_2 may be associated with Slice_3 as a highest priority slice and Slice_1 as a lower priority slice after the modification. Additionally, DNN_4 may be associated with Slice_2 as a highest priority slice, Slice_1 as a lower priority slice, and Slice_3 may remain as a lowest priority slice after the modification. In some embodiments, the modification of slice priority may be based on a degree of network congestion or otherwise based on values included in network analytics or other information. For example, when Slice_1 is moderately congested, its priority may be reduced by a moderate amount (e.g., a score or other priority value for Slice_1 may be reduced by a moderate amount, as compared to scores or priority values for other slices), while when Slice_1 is heavily congested, its priority may be reduced by a greater amount.

Figure 4:
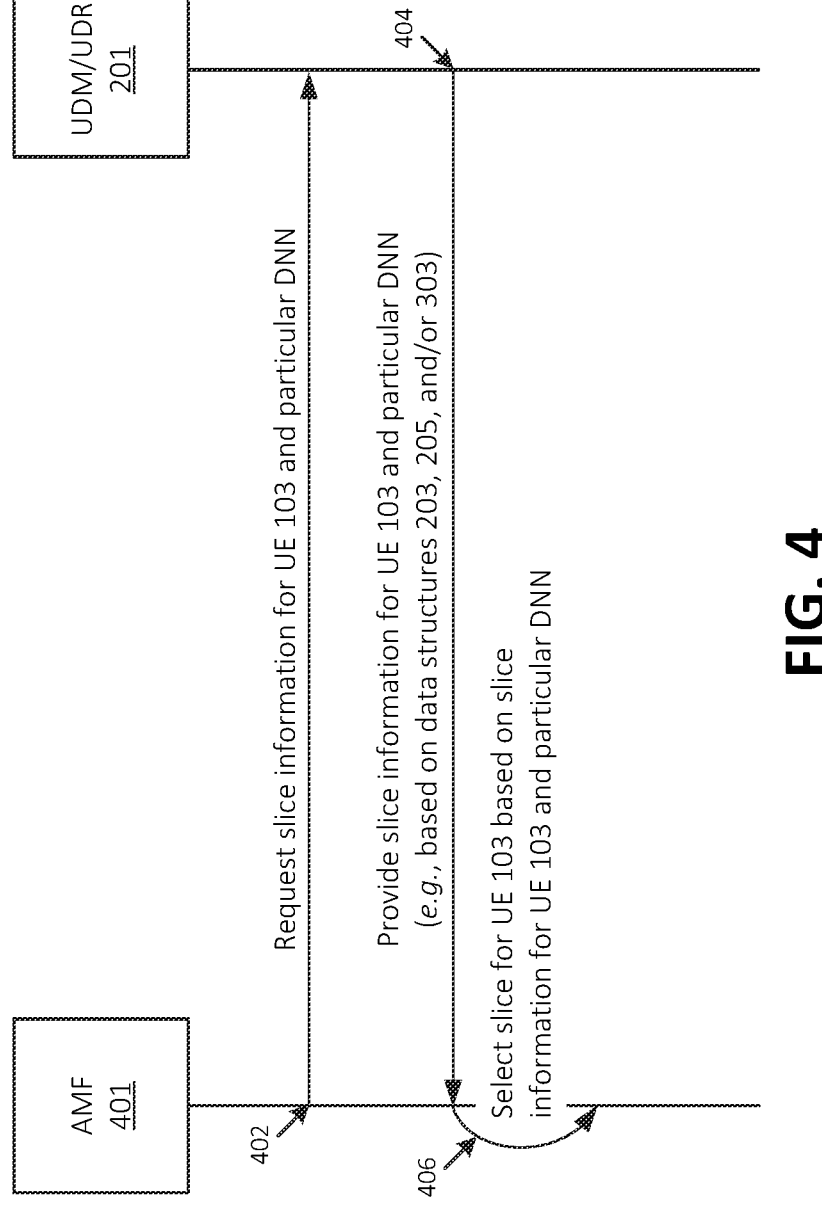
FIG. 4 illustrates an example of identifying a network slice for a UE based on a particular identifier, in accordance with some embodiments.

FIG. 4 illustrates an example of the providing of dynamic slice selection information in response to a request that includes a DNN or other suitable value, in accordance with some embodiments. The example of FIG. 4 includes messaging between Access and Mobility Function ("AMF") 401 and UDM/UDR 201. In practice, similar concepts may apply for messaging between UDM/UDR 201 and other NFs, such as a Session Management Function ("SMF") and/or other suitable NFs. Further, as noted above, some of the operations described with regard to UDM/UDR 201 may be performed by a UDM and/or a UDR. In some such embodiments, the UDM and UDR may communicate with each other, such as to request and/or provide information (e.g., slice priority information, DNN information, UE information, etc.) in accordance with such embodiments.

As shown, AMF 401 may output (at 402) a request for slice information for a particular UE 103 and a particular DNN. AMF 401 may output the request based on, for example, receiving an attach request associated with UE 103, receiving a PDU session establishment request associated with UE 103, receiving a handover or other mobility request associated with UE 103, and/or based on some other suitable operation. In accordance with such procedures, AMF 401 may identify one or more network slices associated with the request, such as based on a DNN included in the request or otherwise determined by AMF 401. For example, when requesting a PDU session establishment, UE 103 may specify a particular DNN based on UE Route Selection Policy ("URSP") rules and/or based on other suitable information.

The request (at 402) may include an identifier of UE 103, such as a SUPI, a GUTI, an IMEI, and/or other suitable identifiers. UDM/UDR 201 may identify and provide (at 404) slice information based on the request, such as by identifying portions of data structures 203, 205, and/or 303 that are applicable to UE 103 as well as the requested DNN.

In some embodiments, a UDM may receive (at 402) the request and may query a UDR or other suitable device or system to obtain some or all of the requested information. AMF 401 may select (at 406) a particular slice for UE 103, based on the received (at 404) slice information as well as the requested DNN. AMF 401 may proceed with further operations based on the selected slice, such as by completing or facilitating a PDU session establishment via the selected slice, completing or facilitating an attach request via the selected slice, etc.

Figure 5A:
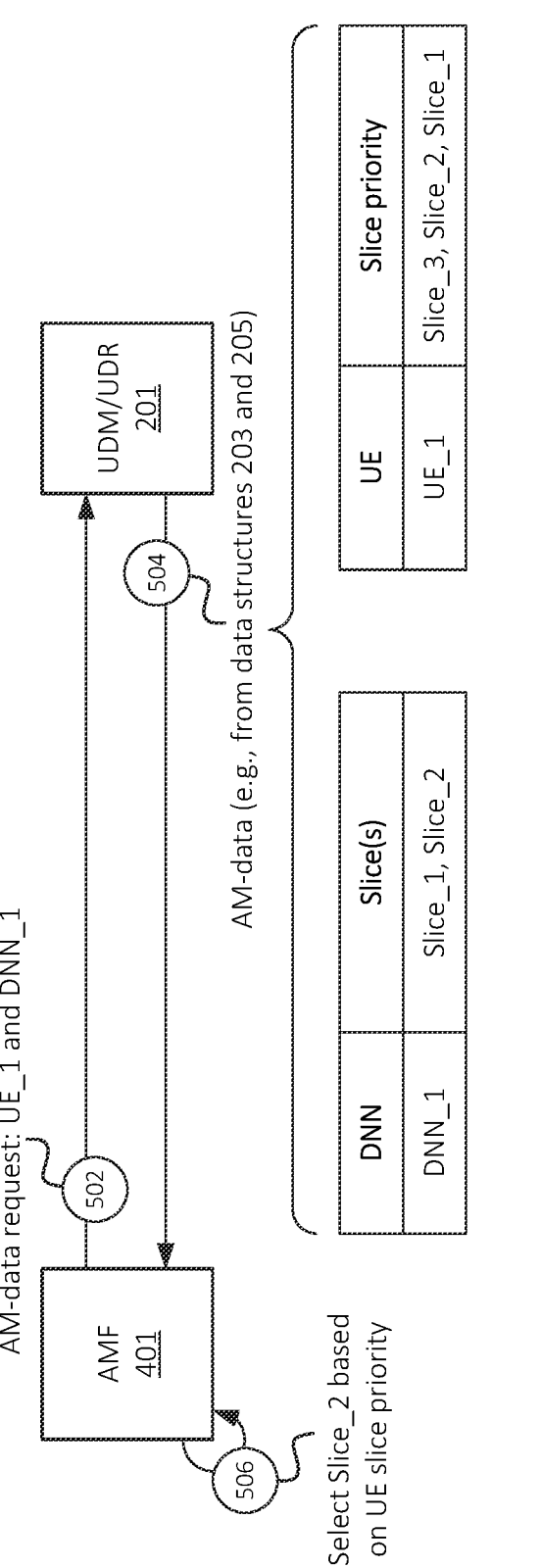
FIGS. 5A, 5B, and 6 illustrate examples of identifying network slices for UEs based on a particular identifier and network slice priority information, in accordance with some embodiments.
Figure 5B:
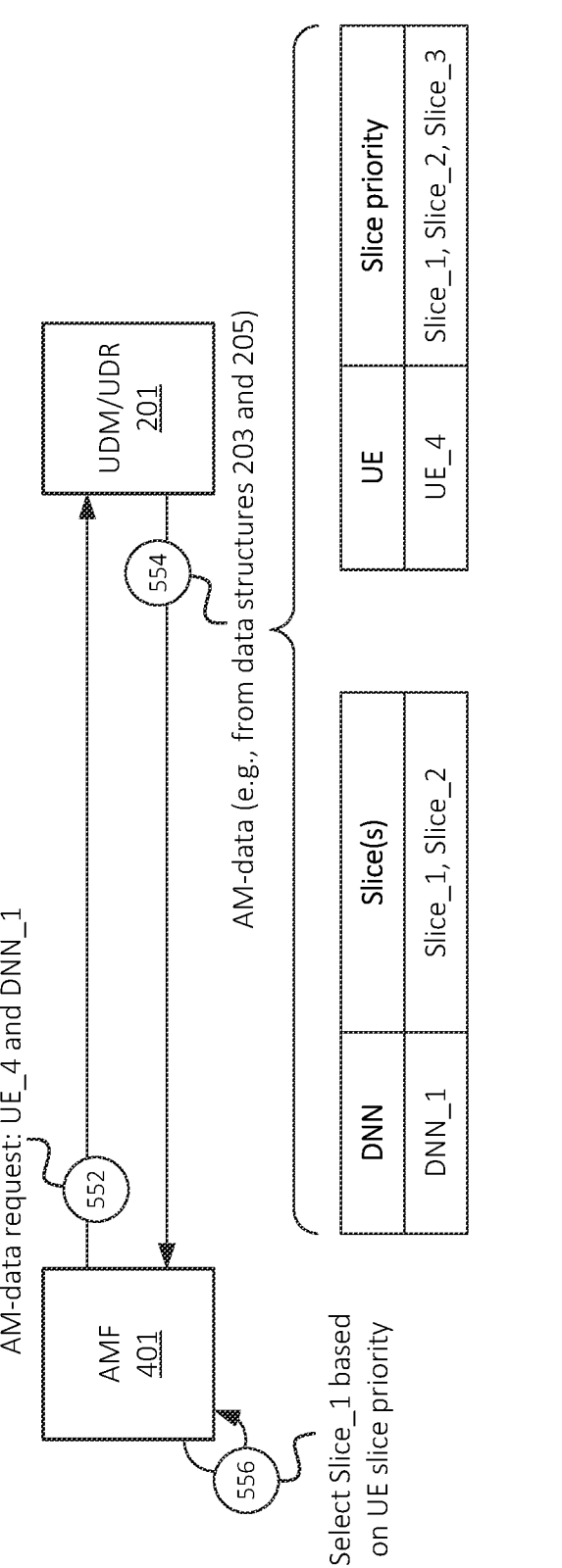
Figure 6:
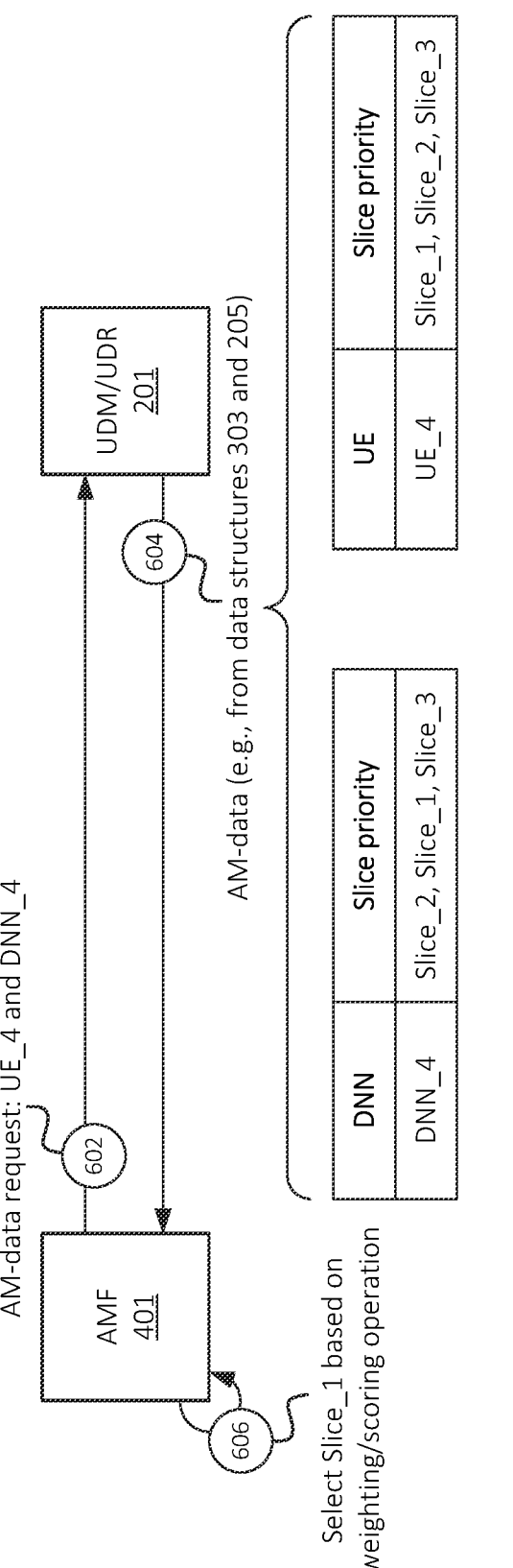

FIGS. 5A, 5B, and 6 provide examples of an example slice selection procedure that may be performed (e.g., by AMF 401 or some other NF that receives slice information from UDM/UDR 201). As shown in FIG. 5A, AMF 401 may request (at 502) access and mobility information (e.g., "AM-data") from UDM/UDR 201, which may include requesting slice information for a requested DNN (i.e., DNN_1 in this example) and a particular UE 103 (i.e., UE_1 in this example). UDM/UDR 201 may provide (at 504) the requested access and mobility information, including DNN information for DNN_1 (e.g., based on data structure 203) and UE information for UE_1 (e.g., based on data structure 205). As similarly noted above, the DNN information may indicate that DNN_1 may be served by Slice_1 and/or Slice_2, and the UE information may indicate that Slice_3 is a highest priority slice for UE_1, that Slice_2 is a next highest priority slice for UE_1, and that Slice_1 is the lowest priority slice for UE_1. In this example, AMF 401 may select (at 506) Slice_2, based on the UE information indicating that Slice_2 is the highest priority slice out of the slices that are eligible to serve DNN_1.

FIG. 5B illustrates another example slice selection procedure, in which AMF 401 requests (at 552) access and mobility information for UE_4 and DNN_1 (i.e., the same DNN and a different UE as the example of FIG. 5A). UDM/UDR 201 may provide (at 554) the same DNN information as discussed above with regard to FIG. 5A, which indicates that DNN_1 may be served by Slice_1 and/or Slice_2. In this example, the UE information indicates that Slice_1 is a highest priority slice for UE_4, that Slice_2 is a next highest priority slice for UE_4, and that Slice_3 is the lowest priority slice for UE_4. In this example, AMF 401 may select (at 556) Slice_1, based on the UE information indicating that Slice_1 is the highest priority slice out of the slices that are eligible to serve DNN_1.

In the examples of FIGS. 5A and 5B, the DNN information does not necessarily indicate a "universal" or "system-wide" slice priority or score for given slices, in accordance with some embodiments. FIG. 6 provides an example in which a "universal" or "system-wide" slice priority is provided, and a slice is selected for a given UE 103 based on such "universal" or "system-wide" slice priority. As shown, AMF 401 may request (at 602) access and mobility information for UE_4 and DNN_4, and UDM/UDR 201 may provide (at 604) DNN information, including a "universal" or "system-wide" slice priority for slices that serve DNN_4 (e.g., based on data structure 303), as well as UE-specific slice priority information (e.g., based on data structure 205). In this example, Slice_2 is the highest priority slice as indicated by the "universal" or "system-wide" slice priority information, while Slice_1 is the highest priority slice as indicated by the UE-specific slice priority information. AMF 401 may perform (at 606) a scoring, weighting, or other suitable selection procedure to select a particular slice for UE_4. For example, in some embodiments, the "universal" or "system-wide" slice priority may be more heavily weighted than the UE-specific slice priority information, or vice versa. In some embodiments, the weighting or selection procedure may include, or may be refined by, performing AI/ML techniques.

FIG. 7 illustrates an example process 700 for identifying a network slice for a particular UE 103 based on network slice priority information, in accordance with some embodiments. In some embodiments, some or all of process 700 may be performed by a NF of a wireless network, such as by AMF 401, an SMF, or other suitable device, system, or NF.

As shown, process 700 may include receiving (at 702) a request associated with a particular UE 103. For example, as discussed above, AMF 401 may receive communication session (e.g., PDU session) establishment request from UE 103 and/or from some other source, may receive a handover request associated with UE 103, a communication session modification request associated with UE 103, and/or some other type of request. In some embodiments, the request may be some other type of request, and/or may be received by an SMF or other suitable network element. In some embodiments, the request may include a DNN and/or other indication of a network slice that is associated with the request.

Process 700 may further include outputting (at 704) a request for slice information associated with UE 103. For example, AMF 401, an SMF, etc. may output a query to UDM/UDR 201 and/or other suitable device or system for an indication of a network slice (e.g., a Network Slice Selection Assistance Information ("NSSAI") value or other suitable indication) that is associated with the request. As discussed above, UDM/UDR 201 may maintain information indicating slice priorities on a per-UE basis or on a "universal" or "system-wide" basis. Further, UDM/UDR 201 may maintain information indicating multiple network slices associated with a given DNN or other parameter, inasmuch as a single DNN or other parameter may be associated with multiple network slices.

Process 700 may additionally include receiving (at 706) an indication of multiple network slices in response to the request. In some embodiments, the received indication may include slice priority information. For example, AMF 401, an SMF, etc. may receive an indication that multiple network slices are available based on the request, inasmuch as such multiple network slices are authorized for use by UE 103 and/or are associated with a DNN or other value associated with the request.

Process 700 may also include selecting (at 708) a particular network slice based on the slice priority information. For example, AMF 401, an SMF, etc. may select a particular network slice, out of multiple eligible network slices, based on the slice priority information. Examples of such selection are provided above with respect to FIGS. 5A, 5B, and 6.

Process 700 may further include responding (at 710) to the request in accordance with the selected particular network slice. For example, AMF 401, an SMF, etc. may respond by completing or proceeding with a communication session establishment procedure, completing or proceeding with a handover procedure, routing or forwarding the request to another AMF 401 or SMF that is associated with the selected slice, and/or may perform other suitable operations in response to the request, based on the selected network slice.

Figure 8:
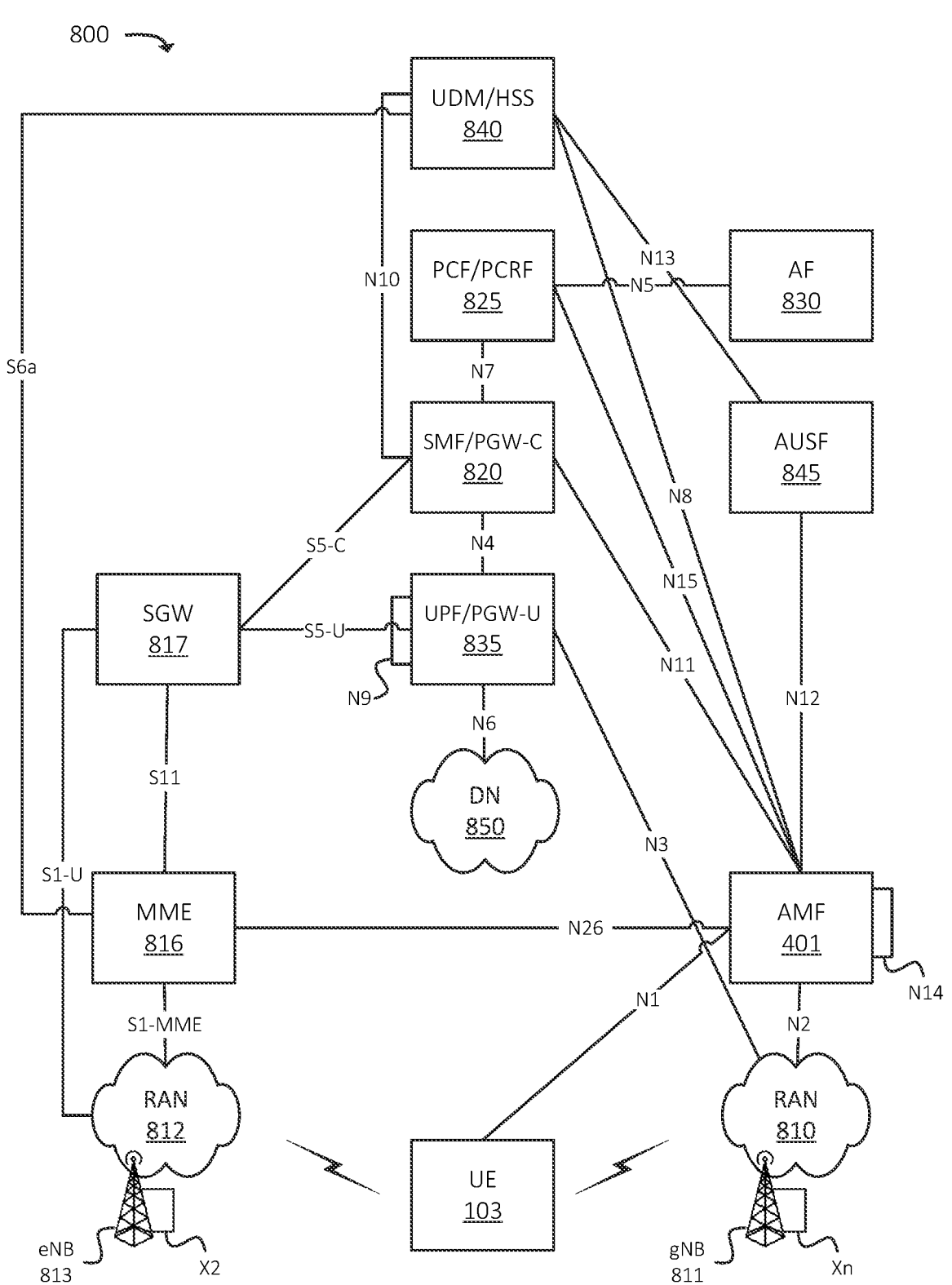
FIGS. 8 and 9 illustrate example environments in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 800 may represent or may include a 5G core ("5GC"). As shown, environment 800 may include UE 103, RAN 810 (which may include one or more Next Generation Node Bs ("gNBs") 811), RAN 812 (which may include one or more evolved Node Bs ("eNBs") 813), and various network functions such as AMF 401, Mobility Management Entity ("MME") 816, Serving Gateway ("SGW") 817, SMF/ Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Unified Data Management ("UDM")/Home Subscriber Server ("HSS") 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850).

The example shown in FIG. 8 illustrates one instance of each network component or function (e.g., one instance of SMF/PGW-C 820, PCF/PCRF 825, UPF/PGW-U 835, UDM/HSS 840, and/or AUSF 845). In practice, environment 800 may include multiple instances of such components or functions. For example, in some embodiments, environment 800 may include multiple "slices" of a core network, where each slice includes a discrete and/or logical set of network functions (e.g., one slice may include a first instance of AMF 401, SMF/PGW-C 820, PCF/PCRF 825, and/or UPF/PGW-U 835, while another slice may include a second instance of AMF 401, SMF/PGW-C 820, PCF/PCRF 825, and/or UPF/PGW-U 835). The different slices may provide differentiated levels of service, such as service in accordance with different QoS parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. In some implementations, one or more devices of environment 800 may be physically integrated in, and/or may be physically attached to, one or more other devices of environment 800. Alternatively, or additionally, one or more of the devices of environment 800 may perform one or more network functions described as being performed by another one or more of the devices of environment 800.

Elements of environment 800 may interconnect with each other and/or other devices via wired connections, wireless connections, or a combination of wired and wireless connections. Examples of interfaces or communication pathways between the elements of environment 800, as shown in FIG. 8, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 8, such as Service-Based Interfaces ("SBIs"), including an Namf interface, an Nudm interface, an Nudr interface, an Npcf interface, an Nupf interface, an Nnef interface, an Nsmf interface, and/or one or more other SBIs. In some embodiments, environment 800 may be, may include, may be implemented by, and/or may be communicatively coupled to network 101.

UE 103 may include a computation and communication device, such as a wireless mobile communication device that is capable of communicating with RAN 810, RAN 812, and/or DN 850. UE 103 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, an M2M device, or the like), a Fixed Wireless Access ("FWA") device, or another type of mobile computation and communication device. UE 103 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 811), via which UE 103 may communicate with one or more other elements of environment 800. UE 103 may communicate with RAN 810 via an air interface (e.g., as provided by gNB 811). For instance, RAN 810 may receive traffic (e.g., user plane traffic such as voice call traffic, data traffic, messaging traffic, etc.) from UE 103 via the air interface, and may communicate the traffic to UPF/PGW-U 835 and/or one or more other devices or networks. Further, RAN 810 may receive signaling traffic, control plane traffic, etc. from UE 103 via the air interface, and may communicate such signaling traffic, control plane traffic, etc. to AMF 401 and/or one or more other devices or networks. Additionally, RAN 810 may receive traffic intended for UE 103 (e.g., from UPF/PGW-U 835, AMF 401, and/or one or more other devices or networks) and may communicate the traffic to UE 103 via the air interface.

RAN 812 may be, or may include, a LTE RAN that includes one or more base stations (e.g., one or more eNBs 813), via which UE 103 may communicate with one or more other elements of environment 800. UE 103 may communicate with RAN 812 via an air interface (e.g., as provided by eNB 813). For instance, RAN 812 may receive traffic (e.g., user plane traffic such as voice call traffic, data traffic, messaging traffic, signaling traffic, etc.) from UE 103 via the air interface, and may communicate the traffic to UPF/PGW-U 835 (e.g., via SGW 817) and/or one or more other devices or networks. Further, RAN 812 may receive signaling traffic, control plane traffic, etc. from UE 103 via the air interface, and may communicate such signaling traffic, control plane traffic, etc. to MME 816 and/or one or more other devices or networks. Additionally, RAN 812 may receive traffic intended for UE 103 (e.g., from UPF/PGW-U 835, MME 816, SGW 817, and/or one or more other devices or networks) and may communicate the traffic to UE 103 via the air interface.

AMF 401 may include one or more devices, systems, Virtualized Network Functions ("VNFs"), Cloud-Native Network Functions ("CNFs"), etc., that perform operations to register UE 103 with the 5G network, to establish bearer channels associated with a session with UE 103, to hand off UE 103 from the 5G network to another network, to hand off UE 103 from the other network to the 5G network, manage mobility of UE 103 between RANs 810 and/or gNBs 811, and/or to perform other operations. In some embodiments, the 5G network may include multiple AMFs 401, which communicate with each other via the N14 interface (denoted in FIG. 8 by the line marked "N14" originating and terminating at AMF 401).

MME 816 may include one or more devices, systems, VNFs, CNFs, etc., that perform operations to register UE 103 with the EPC, to establish bearer channels associated with a session with UE 103, to hand off UE 103 from the EPC to another network, to hand off UE 103 from another network to the EPC, manage mobility of UE 103 between RANs 812 and/or eNBs 813, and/or to perform other operations.

SGW 817 may include one or more devices, systems, VNFs, CNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, CNFs, etc., that gather, process, store, and/or provide information in a manner described herein. SMF/PGW-C 820 may, for example, facilitate the establishment of communication sessions on behalf of UE 103. In some embodiments, the establishment of communications sessions may be performed in accordance with one or more policies provided by PCF/PCRF 825.

PCF/PCRF 825 may include one or more devices, systems, VNFs, CNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, CNFs, etc., that receive, store, and/or provide information that may be used in determining parameters (e.g., quality of service parameters, charging parameters, or the like) for certain applications.

UPF/PGW-U 835 may include one or more devices, systems, VNFs, CNFs, etc., that receive, store, and/or provide data (e.g., user plane data). For example, UPF/PGW-U 835 may receive user plane data (e.g., voice call traffic, data traffic, etc.), destined for UE 103, from DN 850, and may forward the user plane data toward UE 103 (e.g., via RAN 810, SMF/PGW-C 820, and/or one or more other devices). In some embodiments, multiple instances of UPF/PGW-U 835 may be deployed (e.g., in different geographical locations), and the delivery of content to UE 103 may be coordinated via the N9 interface (e.g., as denoted in FIG. 8 by the line marked "N9" originating and terminating at UPF/PGW-U 835). Similarly, UPF/PGW-U 835 may receive traffic from UE 103 (e.g., via RAN 810, RAN 812, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

UDM/HSS 840 and AUSF 845 may include one or more devices, systems, VNFs, CNFs, etc., that manage, update, and/or store, in one or more memory devices associated with AUSF 845 and/or UDM/HSS 840, profile information associated with a subscriber. AUSF 845 and/or UDM/HSS 840 may perform authentication, authorization, and/or accounting operations associated with the subscriber and/or a communication session with UE 103.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 103 may communicate, through DN 850, with data servers, other UEs 103, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 103 may communicate.

Figure 9:
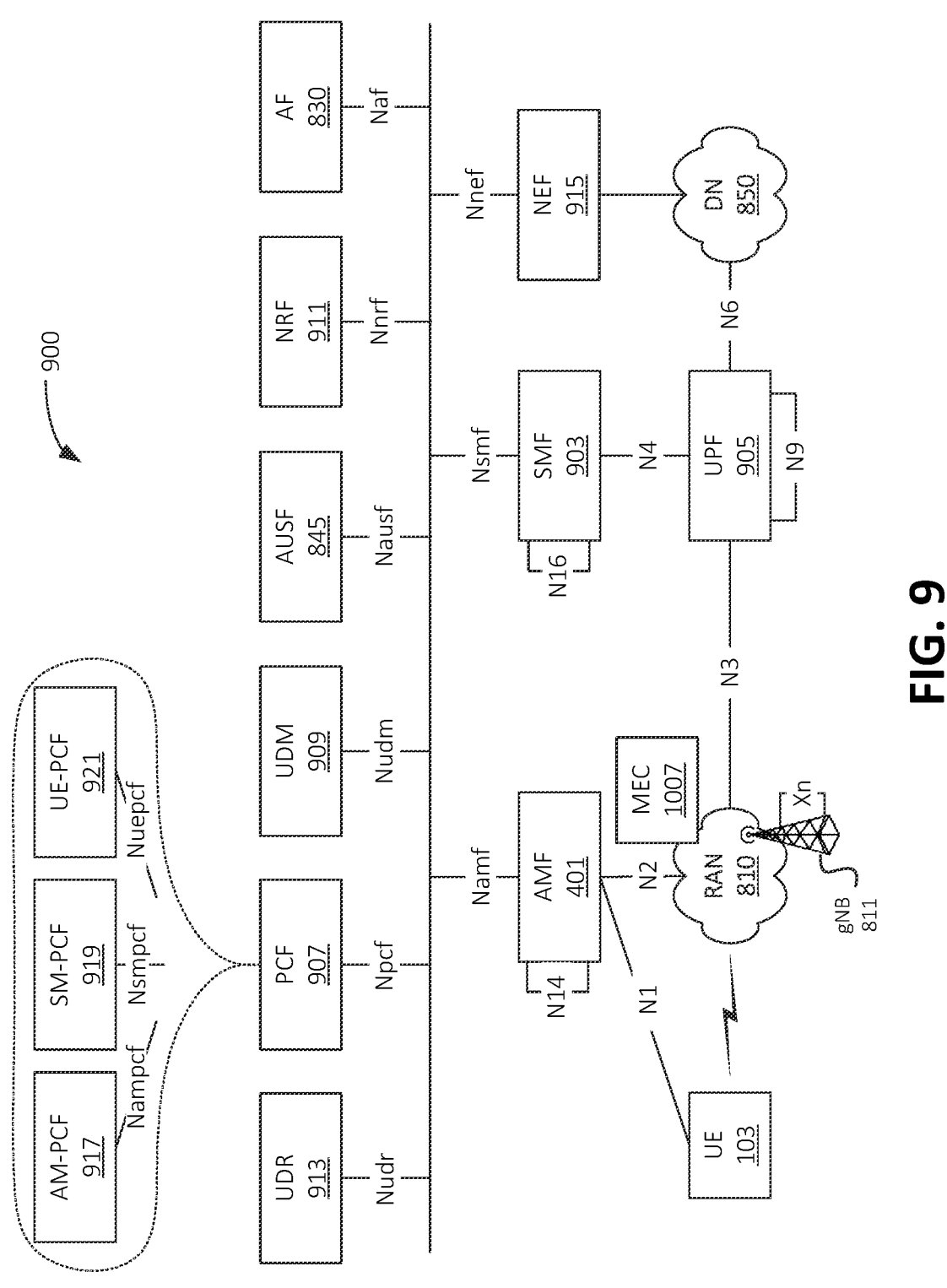

FIG. 9 illustrates another example environment 900, in which one or more embodiments may be implemented. In some embodiments, environment 900 may correspond to a 5G network, and/or may include elements of a 5G network. In some embodiments, environment 900 may correspond to a 5G SA architecture. In some embodiments, environment 900 may include a 5GC, in which 5GC network elements perform one or more operations described herein.

As shown, environment 900 may include UE 103, RAN 810 (which may include one or more gNBs 811 or other types of wireless network infrastructure) and various network functions, which may be implemented as VNFs, CNFs, etc. Such network functions may include AMF 401, SMF 903, UPF 905, PCF 907, UDM 909, AUSF 845, Network Repository Function ("NRF") 911, AF 830, Unified Data Repository ("UDR") 913, and Network Exposure Function ("NEF") 915. Environment 900 may also include or may be communicatively coupled to one or more networks, such as Data Network DN 850.

The example shown in FIG. 9 illustrates one instance of each network component or function (e.g., one instance of SMF 903, UPF 905, PCF 907, UDM 909, AUSF 845, etc.). In practice, environment 900 may include multiple instances of such components or functions. For example, in some embodiments, environment 900 may include multiple "slices" of a core network, where each slice includes a discrete and/or logical set of network functions (e.g., one slice may include a first instance of SMF 903, PCF 907, UPF 905, etc., while another slice may include a second instance of SMF 903, PCF 907, UPF 905, etc.). Additionally, or alternatively, one or more of the network functions of environment 900 may implement multiple network slices. The different slices may provide differentiated levels of service, such as service in accordance with different QoS parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. In some implementations, one or more devices of environment 900 may be physically integrated in, and/or may be physically attached to, one or more other devices of environment 900. Alternatively, or additionally, one or more of the devices of environment 900 may perform one or more network functions described as being performed by another one or more of the devices of environment 900.

Elements of environment 900 may interconnect with each other and/or other devices via wired connections, wireless connections, or a combination of wired and wireless connections. Examples of interfaces or communication pathways between the elements of environment 900, as shown in FIG. 9, may include interfaces shown in FIG. 9 and/or one or more interfaces not explicitly shown in FIG. 9. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 900 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 401), an Nudm interface (e.g., indicating communications to be routed to UDM 909), an Npcf interface, an Nupf interface, an Nnef interface, an Nsmf interface, an Nnrf interface, an Nudr interface, an Naf interface, and/or one or more other SBIs. In some embodiments, environment 900 may be, may include, may be implemented by, and/or may be communicatively coupled to network 101.

UPF 905 may include one or more devices, systems. VNFs, CNFs, etc., that receive, route, process, and/or forward traffic (e.g., user plane traffic). As discussed above, UPF 905 may communicate with UE 103 via one or more communication sessions, such as PDU sessions. Such PDU sessions may be associated with a particular network slice or other suitable QoS parameters, as noted above. UPF 905 may receive downlink user plane traffic (e.g., voice call traffic, data traffic, etc. destined for UE 103) from DN 850, and may forward the downlink user plane traffic toward UE 103 (e.g., via RAN 810). In some embodiments, multiple UPFs 905 may be deployed (e.g., in different geographical locations), and the delivery of content to UE 103 may be coordinated via the N9 interface. Similarly, UPF 905 may receive uplink traffic from UE 103 (e.g., via RAN 810), and may forward the traffic toward DN 850. In some embodiments, UPF 905 may implement, may be implemented by, may be communicatively coupled to, and/or may otherwise be associated with UPF/PGW-U 835. In some embodiments, UPF 905 may communicate (e.g., via the N4 interface) with SMF 903, regarding user plane data processed by UPF 905 (e.g., to provide analytics or reporting information, to receive policy and/or authorization information, etc.).

PCF 907 may include one or more devices, systems, VNFs, CNFs, etc., that aggregate, derive, generate, etc. policy information associated with the 5GC and/or UEs 103 that communicate via the 5GC and/or RAN 810. PCF 907 may receive information regarding policies and/or subscriptions from one or more sources, such as subscriber databases (e.g., UDM 909, UDR 913, etc.), and/or from one or more users such as, for example, an administrator associated with PCF 907. In some embodiments, the functionality of PCF 907 may be split into multiple network functions or subsystems, such as access and mobility PCF ("AM-PCF") 917, session management PCF ("SM-PCF") 919, UE PCF ("UE- PCF") 921, and so on. Such different "split" PCFs may be associated with respective SBIs (e.g., AM-PCF 917 may be associated with an Nampcf SBI, SM-PCF 919 may be associated with an Nsmpcf SBI, UE-PCF 921 may be associated with an Nuepcf SBI, and so on) via which other network functions may communicate with the split PCFs. The split PCFs may maintain information regarding policies associated with different devices, systems, and/or network functions.

NRF 911 may include one or more devices, systems, VNFs, CNFs, etc. that maintain routing and/or network topology information associated with the 5GC. For example, NRF 911 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 913 may include one or more devices, systems, VNFs, CNFs, etc. that provide user and/or subscriber information, based on which PCF 907 and/or other elements of environment 900 may determine access policies, QoS policies, charging policies, or the like. In some embodiments, UDR 913 may receive such information from UDM 909 and/or one or more other sources.

NEF 915 include one or more devices, systems, VNFs, CNFs, etc. that provide access to information, application programming interfaces ("APIs"), and/or other operations or mechanisms of the 5GC to devices or systems that are external to the 5GC. NEF 915 may maintain authorization and/or authentication information associated with such external devices or systems, such that NEF 915 is able to provide information, that is authorized to be provided, to the external devices or systems. Such information may be received from other network functions of the 5GC (e.g., as authorized by an administrator or other suitable entity associated with the 5GC), such as SMF 903, UPF 905, a charging function ("CHF") of the 5GC, and/or other suitable network function. NEF 915 may communicate with external devices or systems via DN 850 and/or other suitable communication pathways.

While environment 900 is described in the context of a 5GC, as noted above, environment 900 may, in some embodiments, include or implement one or more other types of core networks. For example, in some embodiments, environment 900 may be or may include a converged packet core, in which one or more elements may perform some or all of the functionality of one or more 5GC network functions and/or one or more EPC network functions. For example, in some embodiments, AMF 401 may include, may implement, may be implemented by, and/or may otherwise be associated with MME 816; SMF 903 may include, may implement, may be implemented by, and/or may otherwise be associated with SGW 817; PCF 907 may include, may implement, may be implemented by, and/or may otherwise be associated with a PCRF; NEF 915 may include, may implement, may be implemented by, and/or may otherwise be associated with a Service Capability Exposure Function ("SCEF"); and so on.

Figure 10:
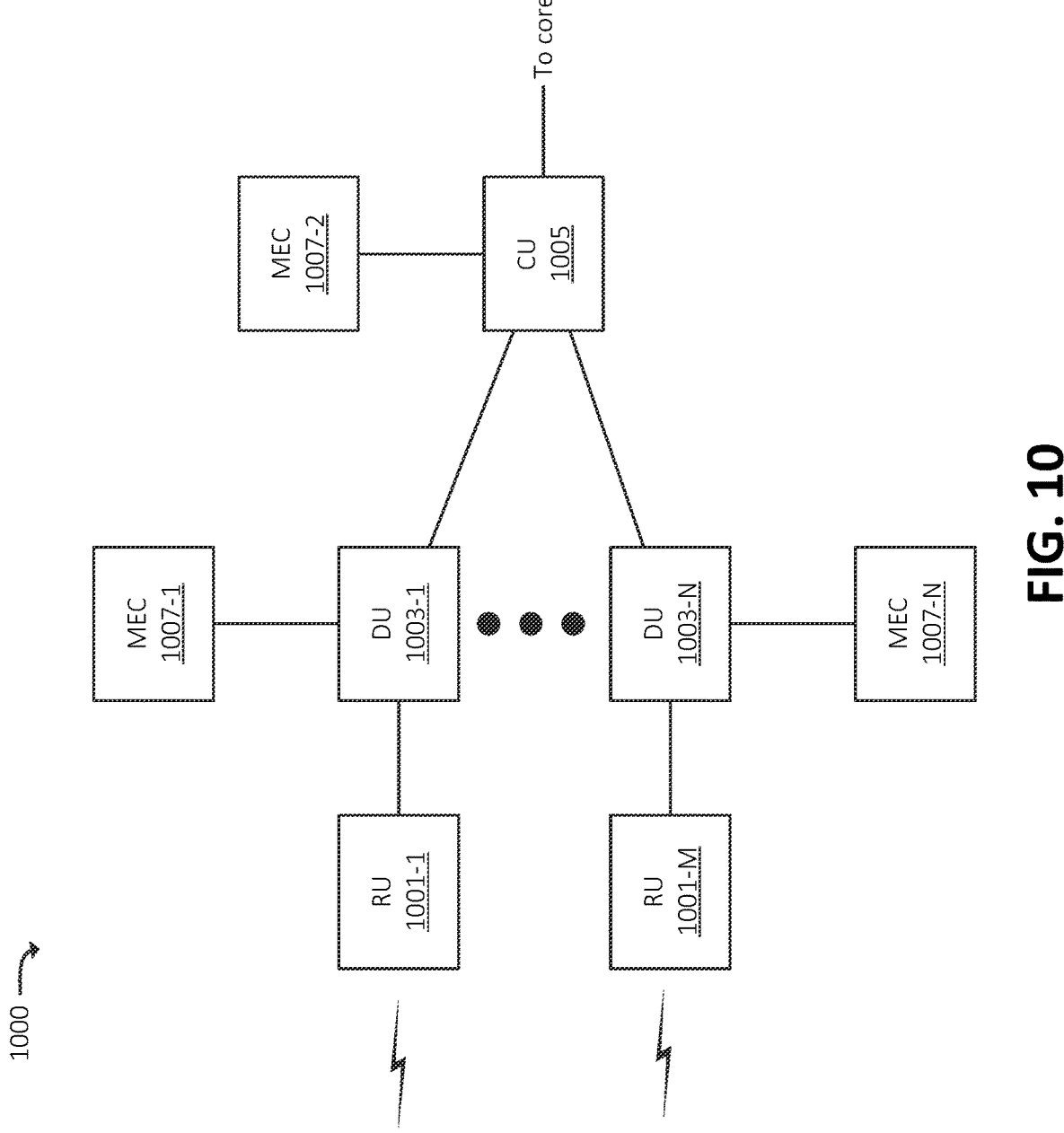
FIG. 10 illustrates an example arrangement of a RAN, in accordance with some embodiments.

FIG. 10 illustrates an example RAN environment 1000, which may be included in and/or implemented by one or more RANs (e.g., RAN 810 or some other RAN). In some embodiments, a particular RAN 810 may include one RAN environment 1000. In some embodiments, a particular RAN 810 may include multiple RAN environments 1000. In some embodiments, RAN environment 1000 may correspond to a particular gNB 811 of RAN 810. In some embodiments, RAN environment 1000 may correspond to multiple gNBs 811. In some embodiments, RAN environment 1000 may correspond to one or more other types of base stations of one or more other types of RANs. As shown, RAN environment 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 401 and/or UPF 905). In the uplink direction (e.g., for traffic from UEs 103 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 103, and may determine which DU(s) 1003 should receive the downlink traffic. DU 1003 may include one or more devices that transmit traffic between a core network (e.g., via CU 1005) and UE 103 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 103.

RU 1001 may include hardware circuitry (e.g., one or more RF transceivers, antennas, radios, and/or other suitable hardware) to communicate wirelessly (e.g., via an RF interface) with one or more UEs 103, one or more other DUs 1003 (e.g., via RUs 1001 associated with DUs 1003), and/or any other suitable type of device. In the uplink direction, RU 1001 may receive traffic from UE 103 and/or another DU 1003 via the RF interface and may provide the traffic to DU 1003. In the downlink direction, RU 1001 may receive traffic from DU 1003, and may provide the traffic to UE 103 and/or another DU 1003.

One or more elements of RAN environment 1000 may, in some embodiments, be communicatively coupled to one or more Multi-Access/Mobile Edge Computing ("MEC") devices, referred to sometimes herein simply as a "MECs," 1007. For example, DU 1003-1 may be communicatively coupled to MEC 1007-1, DU 1003-N may be communicatively coupled to MEC 1007-N, CU 1005 may be communicatively coupled to MEC 1007-2, and so on. MECs 1007 may include hardware resources (e.g., configurable or provisionable hardware resources) that may be configured to provide services and/or otherwise process traffic to and/or from UE 103, via a respective RU 1001.

For example, DU 1003-1 may route some traffic, from UE 103, to MEC 1007-1 instead of to a core network via CU 1005. MEC 1007-1 may process the traffic, perform one or more computations based on the received traffic, and may provide traffic to UE 103 via RU 1001-1. In some embodiments, MEC 1007 may include, and/or may implement, some or all of the functionality described above with respect to UPF 905, AF 830, and/or one or more other devices, systems, VNFs, CNFs, etc. In this manner, ultra-low latency services may be provided to UE 103, as traffic does not need to traverse DU 1003, CU 1005, links between DU 1003 and CU 1005, and an intervening backhaul network between RAN environment 1000 and the core network.

Figure 11:
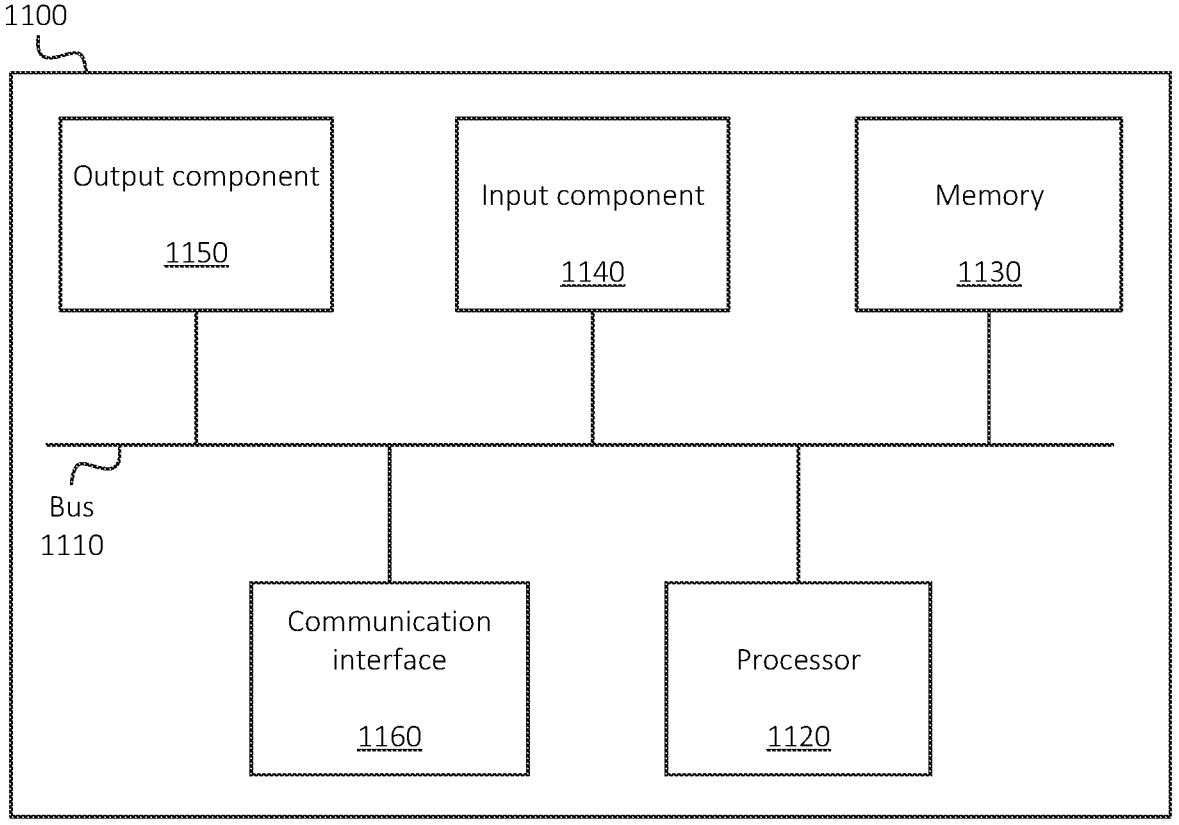
FIG. 11 illustrates example components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions (e.g., processor-executable instructions). In some embodiments, processor 1120 may be or may include one or more hardware processors. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100 and/or other receives or detects input from a source external to input component 1140, such as a touchpad, a touchscreen, a keyboard, a keypad, a button, a switch, a microphone or other audio input component, etc. In some embodiments, input component 1140 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing instructions, such as software instructions, processor-executable instructions, etc. stored in a computer-readable medium, such as memory 1130. A computer-readable medium may be defined as a non-transitory memory device. A memory device may include space within a single physical memory device or spread across multiple physical memory devices. The instructions may be read into memory 1130 from another computer-readable medium or from another device. The instructions stored in memory 1130 may be processor-executable instructions that cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
    receive a first communication session request associated with a first User Equipment ("UE") and a network that includes a plurality of network slices, wherein the first communication session request includes a particular identifier;
    output a first request for network slice information, wherein the first request for network slice information includes the particular identifier;
    receive, in response to the first request for network slice information, network slice information that indicates at least a first network slice and a second network slice that were selected based on the particular identifier;
    identify first network slice priority information, associated with the first UE, that indicates relative priorities of the first and second network slices, wherein the network further maintains second slice priority information associated with a second UE, wherein the first and second slice priority information are different;
    select the first network slice based on the first network slice priority information;
    respond to the first communication session request in accordance with the selected first network slice;
    receive a second communication session request associated with the second UE, wherein the second communication session request includes the particular identifier;
    select the second network slice based on the second network slice priority information; and
    respond to the second communication session request in accordance with the selected second network slice.

2. The device of claim 1, wherein the particular identifier includes a Data Network Name ("DNN").

3. The device of claim 1, wherein the communication session request includes at least one of:
    a Protocol Data Unit ("PDU") session request, or
    an attach request.

4. The device of claim 1, wherein the network slice information is received from at least one of:
    a Unified Data Management ("UDM") function, or
    a Unified Data Repository ("UDR").

5. The device of claim 1, wherein responding to the communication session request includes facilitating a communication session establishment between the UE and the network via the selected first network slice.

6. The device of claim 1, wherein responding to the first and second communication session requests is performed by an Access and Mobility Management Function ("AMF") of the network.

7. A non-transitory computer-readable medium, storing a plurality of processor-executable instructions to:
    receive a first communication session request associated with a first User Equipment ("UE") and a network that includes a plurality of network slices, wherein the first communication session request includes a particular identifier;
    output a first request for network slice information, wherein the first request for network slice information includes the particular identifier;
    receive, in response to the first request for network slice information, network slice information that indicates at least a first network slice and a second network slice that were selected based on the particular identifier;
    identify first network slice priority information, associated with the first UE, that indicates relative priorities of the first and second network slices, wherein the network further maintains second slice priority information associated with a second UE, wherein the first and second slice priority information are different;
    select the first network slice based on the first network slice priority information;
    respond to the first communication session request in accordance with the selected first network slice;
    receive a second communication session request associated with the second UE, wherein the second communication session request includes the particular identifier;
    select the second network slice based on the second network slice priority information; and
    respond to the second communication session request in accordance with the selected second network slice.

8. The non-transitory computer-readable medium of claim 7, wherein the particular identifier includes a Data Network Name ("DNN").

9. The non-transitory computer-readable medium of claim 7, wherein the communication session request includes at least one of:
    a Protocol Data Unit ("PDU") session request, or
    an attach request.

10. The non-transitory computer-readable medium of claim 7, wherein the network slice information is received from at least one of:
    a Unified Data Management ("UDM") function, or
    a Unified Data Repository ("UDR").

11. The non-transitory computer-readable medium of claim 7, wherein responding to the communication session request includes facilitating a communication session establishment between the UE and the network via the selected first network slice.

12. The non-transitory computer-readable medium of claim 7, wherein responding to the first and second communication session requests is performed by at least one of an Access and Mobility Management Function ("AMF") of the network or a Session Management Function ("SMF") of the network.

13. A method, comprising:

receiving a first communication session request associated with a first User Equipment ("UE") and a network that includes a plurality of network slices, wherein the first communication session request includes a particular identifier;

outputting a first request for network slice information, wherein the first request for network slice information includes the particular identifier;

receiving, in response to the first request for network slice information, network slice information that indicates at least a first network slice and a second network slice that were selected based on the particular identifier;

identifying first network slice priority information, associated with the first UE, that indicates relative priorities of the first and second network slices, wherein the network further maintains second slice priority information associated with a second UE, wherein the first and second slice priority information are different;

selecting the first network slice based on the first network slice priority information;

responding to the first communication session request in accordance with the selected first network slice;

receiving a second communication session request associated with the second UE, wherein the second communication session request includes the particular identifier;

selecting the second network slice based on the second network slice priority information; and responding to the second communication session request in accordance with the selected second network slice.

14. The method of claim 13, wherein the particular identifier includes a Data Network Name ("DNN").

15. The method of claim 13, wherein the communication session request includes at least one of:

a Protocol Data Unit ("PDU") session request, or an attach request.

16. The method of claim 13, wherein the network slice information is received from at least one of:

a Unified Data Management ("UDM") function, or a Unified Data Repository ("UDR").

17. The method of claim 13, wherein responding to the communication session request includes facilitating a communication session establishment between the UE and the network via the selected first network slice.

18. The method of claim 13, wherein responding to the first and second communication session requests is performed by an Access and Mobility Management Function ("AMF") of the network.

19. The method of claim 13, wherein responding to the first and second communication session requests is performed by Session Management Function ("SMF") of the network.

20. The method of claim 13, wherein responding to the first and second communication session requests is performed by Session Management Function ("SMF") of the network.

* * * * *